US011731492B2

(12) United States Patent
Kuehner

(10) Patent No.: US 11,731,492 B2
(45) Date of Patent: Aug. 22, 2023

(54) SYSTEMS AND METHODS FOR GUIDING A VEHICLE OCCUPANT'S ATTENTION

(71) Applicant: Toyota Research Institute, Inc., Los Altos, CA (US)

(72) Inventor: Manuel Ludwig Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 101 days.

(21) Appl. No.: 17/334,898

(22) Filed: May 31, 2021

(65) Prior Publication Data

US 2022/0379690 A1    Dec. 1, 2022

(51) Int. Cl.
| | |
|---|---|
| *B60J 3/04* | (2006.01) |
| *G06V 10/22* | (2022.01) |
| *G06V 20/59* | (2022.01) |
| *G06V 20/58* | (2022.01) |
| *G06V 40/20* | (2022.01) |
| *G02F 1/1333* | (2006.01) |
| *G02F 1/163* | (2006.01) |
| *G02F 1/133* | (2006.01) |
| *G02F 1/137* | (2006.01) |
| *G06V 40/18* | (2022.01) |

(52) U.S. Cl.
CPC ............ *B60J 3/04* (2013.01); *G06V 10/22* (2022.01); *G06V 20/584* (2022.01); *G06V 20/59* (2022.01); *G06V 40/20* (2022.01); *G02F 1/137* (2013.01); *G02F 1/13306* (2013.01); *G02F 1/133302* (2021.01); *G02F 1/163* (2013.01); *G06V 40/193* (2022.01)

(58) Field of Classification Search
CPC ......................................................... B60J 3/04
See application file for complete search history.

(56) References Cited

U.S. PATENT DOCUMENTS

| | | | |
|---|---|---|---|
| 2009/0168185 A1* | 7/2009 | Augustine .................. | B60J 3/04 |
| | | | 359/613 |
| 2019/0346701 A1* | 11/2019 | Lam ..................... | G06V 20/597 |
| 2020/0133390 A1* | 4/2020 | Patton .................. | G09G 3/3208 |

OTHER PUBLICATIONS

Wikipedia contributors. Smart glass. Wikipedia, The Free Encyclopedia. Dec. 8, 2020. url: https://en.wikipedia.org/wiki/Smart_glass (accessed on Feb. 23, 2021).
Wikipedia contributors. Thin-film transistor. Wikipedia, The Free Encyclopedia. Dec. 8, 2020. url: https://en.wikipedia.org/wiki/Thin-film_transistor (accessed on Feb. 23, 2021).

(Continued)

*Primary Examiner* — Edmond C Lau
(74) *Attorney, Agent, or Firm* — Christopher G. Darrow; Darrow Mustafa PC

(57) ABSTRACT

Systems and methods for guiding a vehicle occupant's attention are disclosed herein. One embodiment selects automatically a particular region of an environment external to a vehicle and guides an occupant of the vehicle to look at the particular region by automatically adjusting the transparency of one or more windows of the vehicle such that a first portion of the one or more windows through which the occupant is able to see the particular region is more transparent than a second portion of the one or more windows that is adjacent to the first portion.

18 Claims, 7 Drawing Sheets

(56) References Cited

OTHER PUBLICATIONS

Suzuki et al., "Semi-Transparent Vision for Driving Assistance," Graduate School of Informatics and Engineering, The University of Electro-Communications, 2012, abstract linked at https://dl.acm.org/doi/abs/10.1145/2407516.2407547.

U.S. Appl. No. 17/112,254, "Systems, Methods, and Vehicles Providing Adaptive Window Transparency for Vehicle Mode Switching," to Manuel Keuhner and assigned to TRI, filed Dec. 4, 2020.

Oosting, "The DreamScreen," Master's Thesis, University of Technology of Eindhoven, The Netherlands, 2006, found at http://citeseerx.ist.psu.edu/viewdoc/download?doi=10.1.1.96.7491&rep=rep1&type=pdf.

Anastas, "Augmented Reality Navigation System for Human Traversal of Rough Terrain," Master's Thesis, Massachusetts Institute of Technology, Sep. 2020, found at https://dspace.mit.edu/bitstream/handle/1721.1/129168/1227276835-MIT.pdf?sequence=1&isAllowed=y.

\* cited by examiner

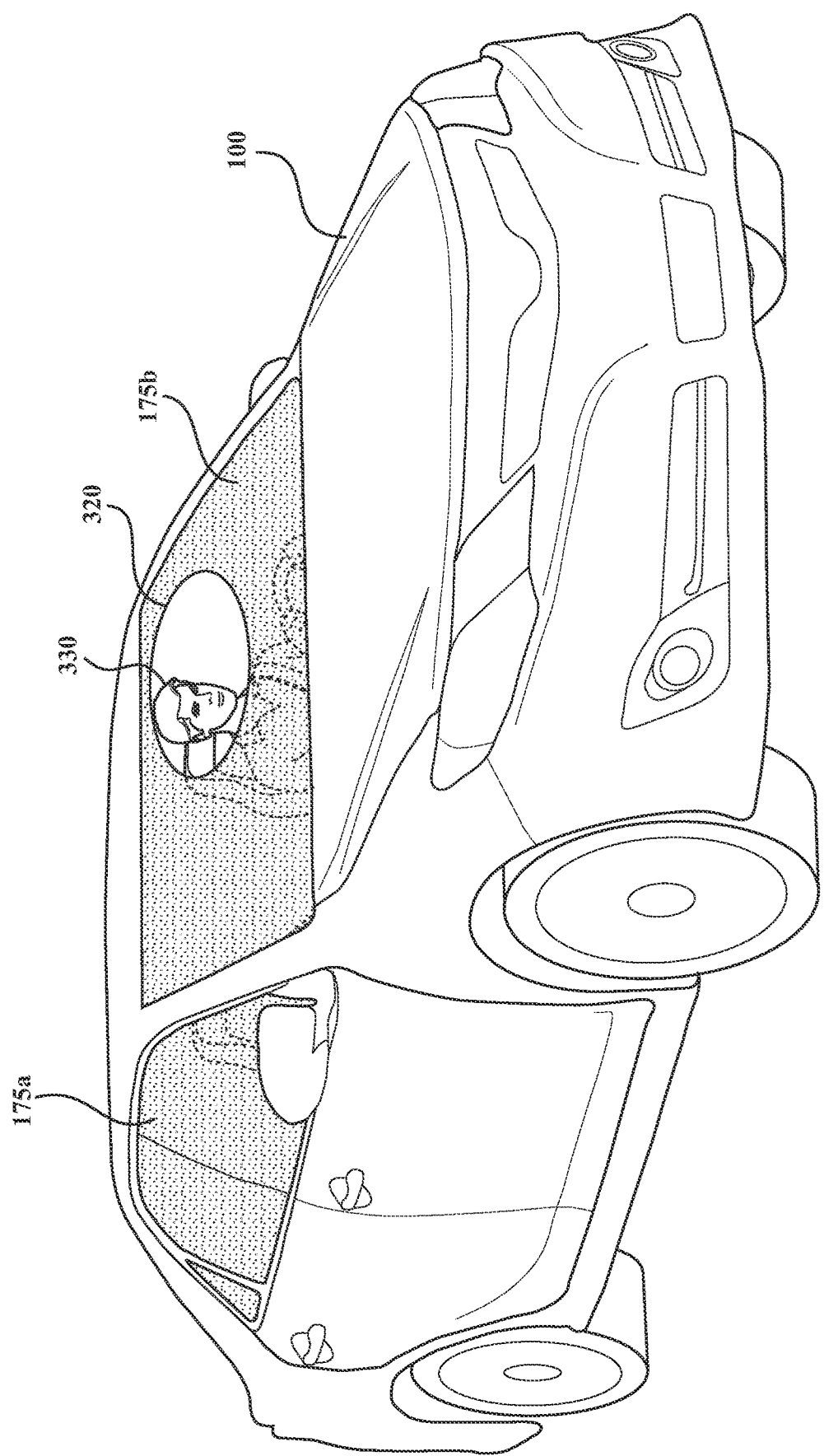

SYSTEMS AND METHODS FOR GUIDING A VEHICLE OCCUPANT'S ATTENTION

TECHNICAL FIELD

The subject matter described herein generally relates to vehicles and, more particularly, to systems and methods for guiding a vehicle occupant's attention.

BACKGROUND

In a variety of situations, there are certain external objects or conditions to which the driver of a vehicle should pay attention. For example, a driver should pay attention to (i.e., look at or notice) a pedestrian crossing the street in front of the vehicle ahead or a bicyclist riding alongside the vehicle. One existing technology that attempts to direct a driver's attention to particular objects or conditions in the external environment is an augmented-reality head-up display (AR-HUD). Such a display can annotate a scene with text and/or graphics to highlight areas of importance or interest. However, AR-HUDs tend to be expensive, often have a limited field of view, and can be bulky. Alternatively, audio cues can be used to direct a driver's attention, but that approach involves using another sense (hearing) to guide the driver's visual sense, meaning it is one step removed from the desired driver visual response.

SUMMARY

An example of a system for guiding a vehicle occupant's attention is presented herein. The system comprises one or more processors and a memory communicably coupled to the one or more processors. The memory stores an environment analysis module including instructions that when executed by the one or more processors cause the one or more processors to select a particular region of an environment external to a vehicle. The memory also stores a transparency control module including instructions that when executed by the one or more processors cause the one or more processors to guide an occupant of the vehicle to look at the particular region by adjusting the transparency of one or more windows of the vehicle such that a first portion of the one or more windows through which the occupant is able to see the particular region is more transparent than a second portion of the one or more windows that is adjacent to the first portion.

Another embodiment is a non-transitory computer-readable medium for guiding a vehicle occupant's attention and storing instructions that when executed by one or more processors cause the one or more processors to select automatically a particular region of an environment external to a vehicle. The instructions also cause the one or more processors to guide an occupant of the vehicle to look at the particular region by automatically adjusting the transparency of one or more windows of the vehicle such that a first portion of the one or more windows through which the occupant is able to see the particular region is more transparent than a second portion of the one or more windows that is adjacent to the first portion.

In another embodiment, a method of guiding a vehicle occupant's attention is disclosed. The method comprises selecting automatically a particular region of an environment external to a vehicle. The method also includes guiding an occupant of the vehicle to look at the particular region by automatically adjusting the transparency of one or more windows of the vehicle such that a first portion of the one or more windows through which the occupant is able to see the particular region is more transparent than a second portion of the one or more windows that is adjacent to the first portion.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

FIG. 3A illustrates deployment of an attention guidance system to guide a vehicle occupant's attention to a particular region of the environment, in accordance with an illustrative embodiment of the invention.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
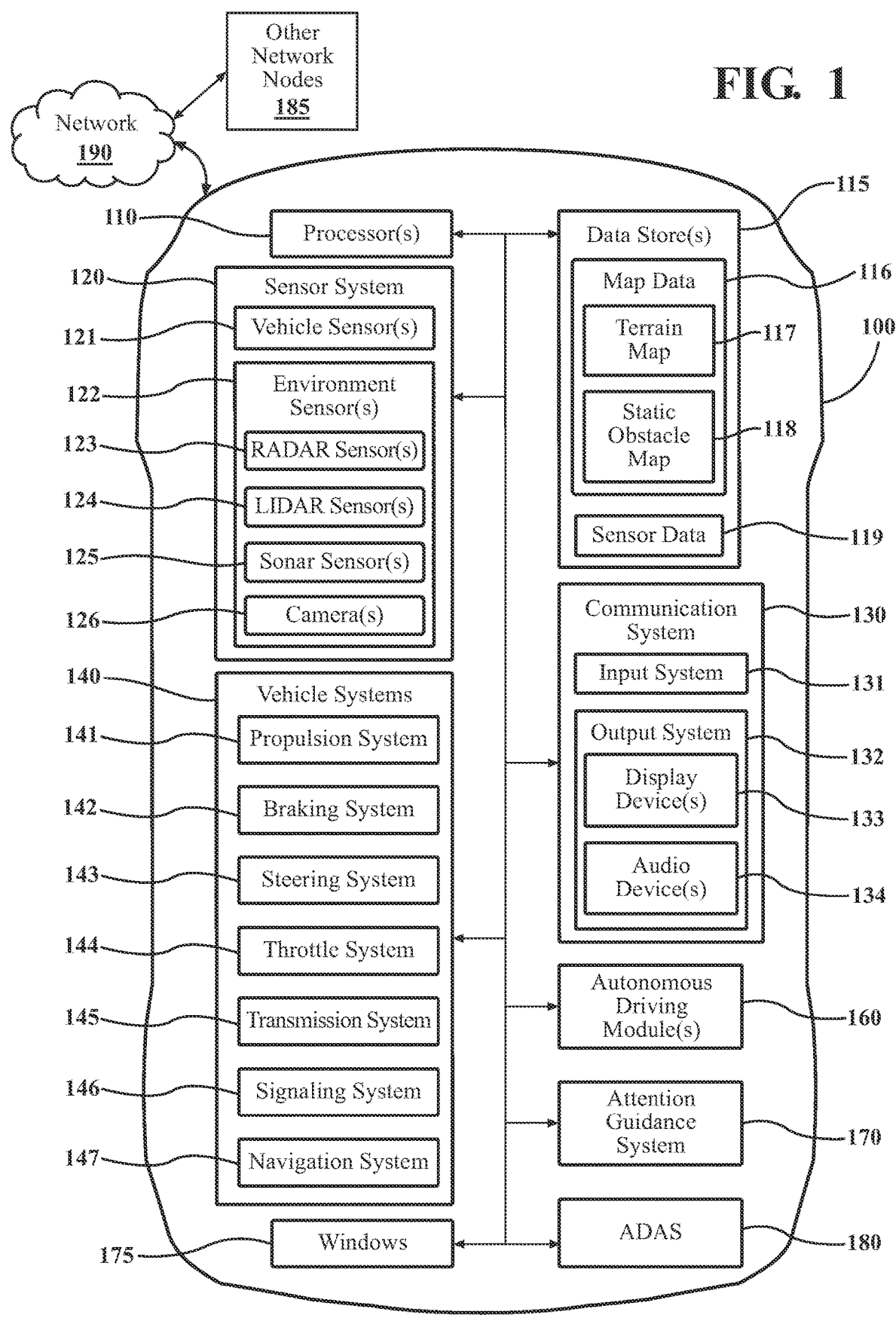
FIG. 1 illustrates one embodiment of a vehicle within which systems and methods disclosed herein may be implemented.

Various embodiments disclosed herein overcome the shortcomings of prior-art approaches such as augmented-reality head-up displays (AR-HUDs) and audible cues by directly guiding a vehicle occupant's attention (gaze) to an important region of the environment external to the vehicle. This direct visual guidance is accomplished by varying the transparency of one or more of the vehicle's windows (windshield, side windows, and/or rear window) to guide the occupant's attention to a particular region of interest. In some embodiments, the adjustable-transparency windows are made of "smart glass" (e.g., electrochromic glass or windows embodying thin-film-transistor (TFT) technology, such as a liquid-crystal display (LCD)). The region of interest could be a portion of the environment where an important traffic situation bearing on safety has been automatically detected, or it could include a landmark that is potentially of interest to a vehicle occupant.

In various embodiments, an attention guidance system in a vehicle selects a particular region of the environment external to a vehicle. As just mentioned, that selection can be based on a traffic situation or context (e.g., involving one or more external road agents such as vehicles, bicyclists, or pedestrians) detected automatically via the vehicle's environment sensors or other information (e.g., information received from a traffic-information server or another connected vehicle). In other embodiments, the particular region can include a landmark (e.g., a building, a performance venue, a sports stadium, a national or state park, a theme park, a store or business, etc.) of interest to a vehicle occupant. Once the particular region has been selected, the system adjusts the transparency of one or more windows of the vehicle such that a portion of the one or more windows through which the occupant is able to see the particular region is more transparent than another portion of the one or more windows that is adjacent to the more-transparent portion. The system, thus, visually "highlights" the particular region by adjusting the transparency of one or more specific portions of the one or more windows to draw the occupant's attention (gaze) to the particular region.

A number of variations are possible, depending on the particular embodiment. In some embodiments, the vehicle occupant whose attention is guided by the system is the driver of the vehicle. In other embodiments, the occupant is a passenger in the vehicle, either because a different person is driving the vehicle or because the vehicle is an autonomous vehicle. Some embodiments include detecting the gaze direction of the occupant and dynamically moving the more-transparent portion of the one or more windows from an initial position that coincides with the occupant's detected gaze direction to a final position at which the occupant is able to see the particular region of interest through the more-transparent portion. The moving more-transparent portion of the window(s) thus leads or draws the occupant's attention from where the occupant is looking initially to the desired particular region of interest in the environment. If the occupant is already looking in the desired direction (i.e., at the particular region), no adjustment in window transparency may be needed, in some situations. In some embodiments, the system divides the more-transparent portion into two sub-portions that straddle a pillar of the vehicle (e.g., the A-Pillar). In general, the system can generate multiple disjoint or connected portions of greater contrasting transparency to ensure that a driver's view of secondarily important traffic objects, situations, or conditions is not obstructed while the driver is looking at the particular region (the region of the environment deemed most important at the time). The various embodiments of an attention guidance system and associated methods are described in greater detail below.

Referring to FIG. 1, an example of a vehicle 100, in which systems and methods disclosed herein can be implemented, is illustrated. A vehicle 100 is sometimes referred to herein as an "ego vehicle" in which an attention guidance system is installed and operative. As used herein, a "vehicle" is any form of motorized transport. One example of a "vehicle," without limitation, is an automobile. In some embodiments, vehicle 100 can operate, at least some of the time, in a fully autonomous mode (e.g., what the automotive industry refers to as autonomy Levels 3-5, particularly Level 5). In other embodiments, vehicle 100 can operate in a semi-autonomous mode (e.g., via an adaptive cruise-control system, an automatic lane-change assistance system, or an automatic parking system). In other embodiments, vehicle 100 includes an intelligent driving assistance system such as an Advanced Driver-Assistance System (ADAS) 180. In still other embodiments, vehicle 100 may be driven manually by a human driver. The vehicle 100 can include an attention guidance system 170 or capabilities to support or interact with the attention guidance system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including attention guidance system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 can communicate with other network nodes 185 (e.g., connected vehicles, cloud servers, edge servers, roadside units, infrastructure) via a network 190. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. One or more of these various types of environment sensors 122 can be used to detect objects (e.g., external road agents such as other vehicles, bicyclists, motorcyclists, pedestrians, and animals) and, in other respects, understand the environment surrounding vehicle 100 and its associated traffic situations and conditions. This process is sometimes referred to as "traffic-situation understanding" or "scene understanding." In some embodiments, this analysis of the external environment and traffic situations can be carried out entirely or in part by ADAS 180. In embodiments in which vehicle 100 is capable of semi-autonomous or fully autonomous operation, vehicle 100 includes autonomous driving module(s) 160 to control autonomous or semi-autonomous operation.

As also shown in FIG. 1, vehicle 100 includes one or more windows 175 (e.g., a windshield, one or more side windows, and a rear window). In some embodiments, vehicle 100 includes all of these types of windows, and the transparency of each window or one or more portions thereof can be adjusted under the electronic control of attention guidance system 170 to generate a portion or portions that are more transparent than adjacent portions. As explained above, the purpose for creating window portions that are more transparent than surrounding/adjacent portions is to guide the attention of a vehicle occupant, whether driver or passenger, to a particular region (e.g., an automatically detected traffic situation or a landmark) of the external environment.

Figure 2:
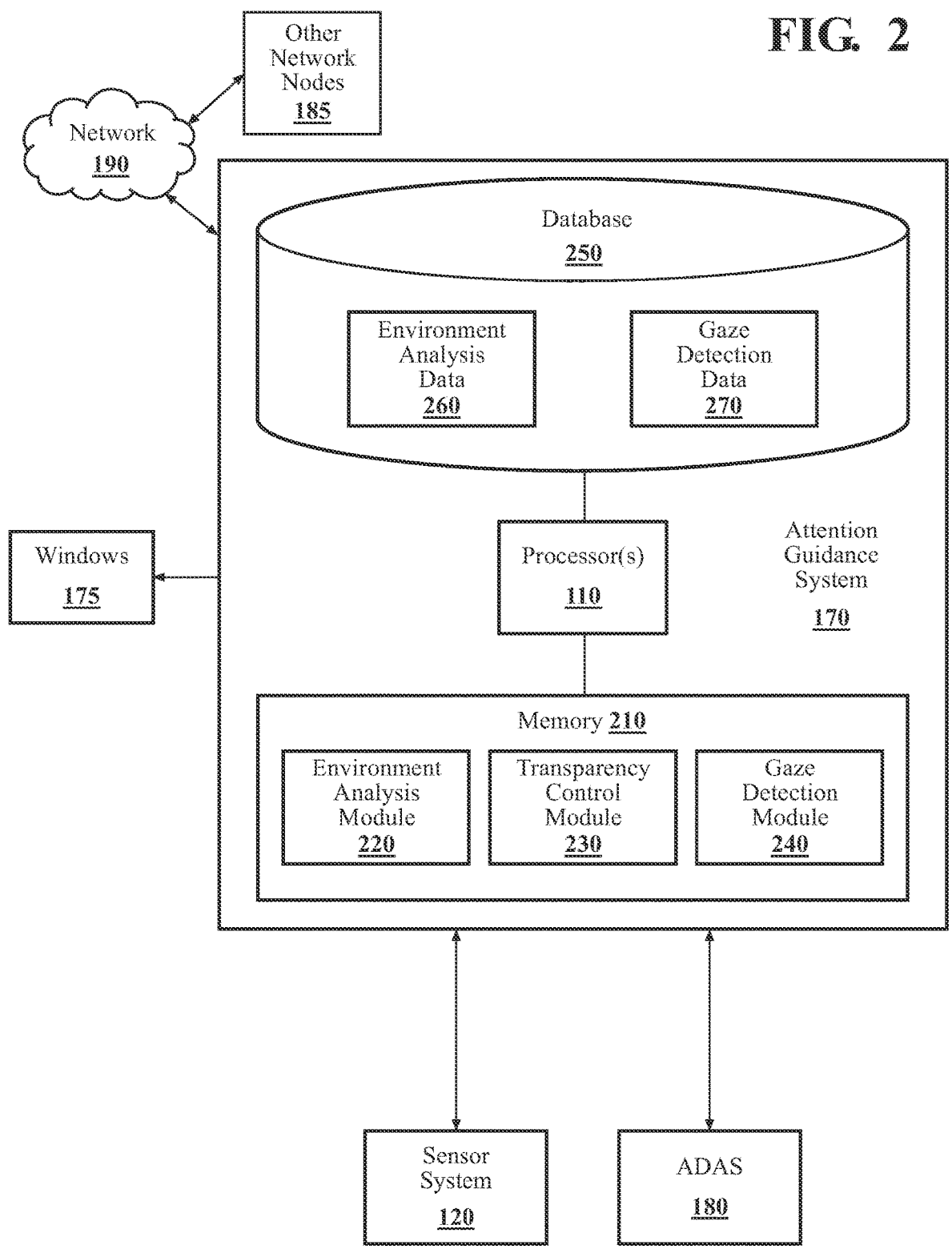
FIG. 2 is a block diagram of an attention guidance system, in accordance with an illustrative embodiment of the invention.

FIG. 2 is a block diagram of an attention guidance system 170, in accordance with an illustrative embodiment of the invention. As discussed above, attention guidance system 170, in some embodiments, is installed in a vehicle 100 (an ego vehicle). In this embodiment, attention guidance system 170 is shown as including one or more processors 110 from the vehicle 100 of FIG. 1. In general, the one or more processors 110 may be a part of attention guidance system 170, attention guidance system 170 may include one or more separate processors from the one or more processors 110 of the vehicle 100, or attention guidance system 170 may access the one or more processors 110 through a data bus or another communication path, depending on the embodiment.

In this embodiment, memory 210 stores an environment analysis module 220, a transparency control module 230, and a gaze detection module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that, when executed by the one or more processors 110, cause the one or more processors 110 to perform the various functions disclosed herein.

As shown in FIG. 2 and as discussed above, attention guidance system 170 can communicate with one or more other network nodes 185 (e.g., other connected vehicles, cloud servers, edge servers, roadside units, infrastructure) via network 190. Attention guidance system 170 can also interface and communicate with sensor system 120 and ADAS 180. In communicating with other connected vehicles, a vehicle 100 can employ Dedicated Short-Range Communications (DSRC), Wi-Fi, or mmWave technology to establish one or more vehicle-to-vehicle (V2V) communication links. In communicating with servers, a vehicle 100 can employ technologies such as cellular data (e.g., LTE, 5G).

Attention guidance system 170 can store various kinds of data in a database 250. Examples include environment analysis data 260 associated with the traffic-situation understanding process discussed above and gaze detection data 270 associated with detecting a vehicle occupant's gaze direction (i.e., the direction in which a vehicle occupant is looking).

Environment analysis module 220 generally includes instructions that when executed by the one or more processors 110 cause the one or more processors 110 to select a particular region of the environment external to a vehicle 100. Selecting a particular region of the environment involves identifying a particular subregion of the environment as being important (e.g., to the safety of vehicle 100 and its occupants) or otherwise of interest to a vehicle occupant (driver or passenger). For example, such a particular region might include one or more external road agents (other vehicles, motorcyclists, bicyclists, pedestrians, and/or animals), obstacles, or road-geometry characteristics (curves, potholes, intersections, on-ramps, etc.) that could lead to a collision or other accident, if the driver of vehicle 100 does not take proper corrective action. In some embodiments, this kind of automated analysis of traffic situations and potential risks is performed by ADAS 180 based on an analysis of sensor data 119 from sensor system 120, as discussed above. Environment analysis module 220 can also receive information (e.g., traffic data and status) from external sources such as traffic-information servers or other connected vehicles. Analysis of sensor data 119 can involve, for example, image segmentation, object detection, object recognition, and road-agent trajectory prediction and tracking. As also discussed above, in a different embodiment, the particular region can include a landmark that is of interest to at least one vehicle occupant. Such a landmark can be identified based on map data 116 and the vehicle's geolocation capabilities (refer to FIG. 1), information received over network 190 from a server or other network node 185, and/or an analysis of sensor data 119 from sensor system 120.

In general, the objective of environment analysis module 220 is to identify one or more particular regions of the external environment to which a vehicle occupant (driver or passenger) should pay attention (i.e., look at and be aware of). When environment analysis module 220 identifies more than one such particular region, one of them will generally be identified as the primary particular region to which the occupant should be paying attention. This analysis to select a particular region is performed rapidly and repeatedly in real time so that, at any given discrete-time instant, environment analysis module 220 outputs one or more prioritized particular regions of the environment to which a vehicle occupant should be paying attention. Of course, the particular region(s) will change frequently over time as vehicle 100 travels along its route, particularly in an urban setting with dense traffic and a large number of external road agents in the environment.

Transparency control module 230 generally includes instructions that when executed by the one or more processors 110 cause the one or more processors 110 to guide an occupant of the vehicle 100 to look at the particular region by adjusting the transparency of one or more windows 175 of the vehicle 100 such that a first portion of the one or more windows through which the occupant is able to see the particular region is more transparent than a second portion of the one or more windows that is adjacent to the first portion. Thus, there is contrasting transparency between the first and second portions that naturally causes the occupant's attention to be drawn to the first (more-transparent) portion. Adjusting the transparency of a particular arbitrarily shaped portion of a window 175 between fully transparent or nearly fully transparent and opaque or nearly opaque is possible because the one or more windows 175 are any of several types known in the art as "smart glass." Examples include, without limitation, electrochromic glass and windows 175 embodying TFT technology, such as a transparent LCD having a glass substrate. In some embodiments, the control of transparency is accomplished by varying the density (resolution) of pixels in the smart glass under electronic control by transparency control module 230.

FIG. 3A illustrates deployment of an attention guidance system 170 to guide a vehicle occupant's attention to a particular region of the environment, in accordance with an illustrative embodiment of the invention. In FIG. 3A, vehicle 100 includes side windows such as side window 175a and a windshield 175b (a rear window and additional side windows, though present, are not visible from the perspective illustrated in FIG. 3A). In this example, environment analysis module 220 has selected, as the particular region discussed above, one that lies approximately straight ahead of the driver of vehicle 100. In this case, transparency control module 230 adjusts the transparency of windshield 175b such that transparent portion 320 (the "first portion" discussed above) is fully or nearly fully transparent, whereas the surrounding and remaining portion of windshield 175b and the entirety of side window 175a (the "second portion" discussed above) is noticeably less transparent than transparent portion 320. The contrasting transparency between the first and second portions guides the driver 330 (shown outside the vehicle in FIG. 3A for clarity) to look through transparent portion 320 to see the particular region selected by environment analysis module 220.

In general, transparency control module 230 can make a transparent portion 320 appear in whatever shape is advantageous under the circumstances. The oval shapes shown in the figures herein are merely one illustrative possibility. In some embodiments, the shape of a transparent portion 320 is selected in accordance with the overall shape (outline) of the particular region of the environment to which the occupant's attention is to be guided.

Figure 3B:
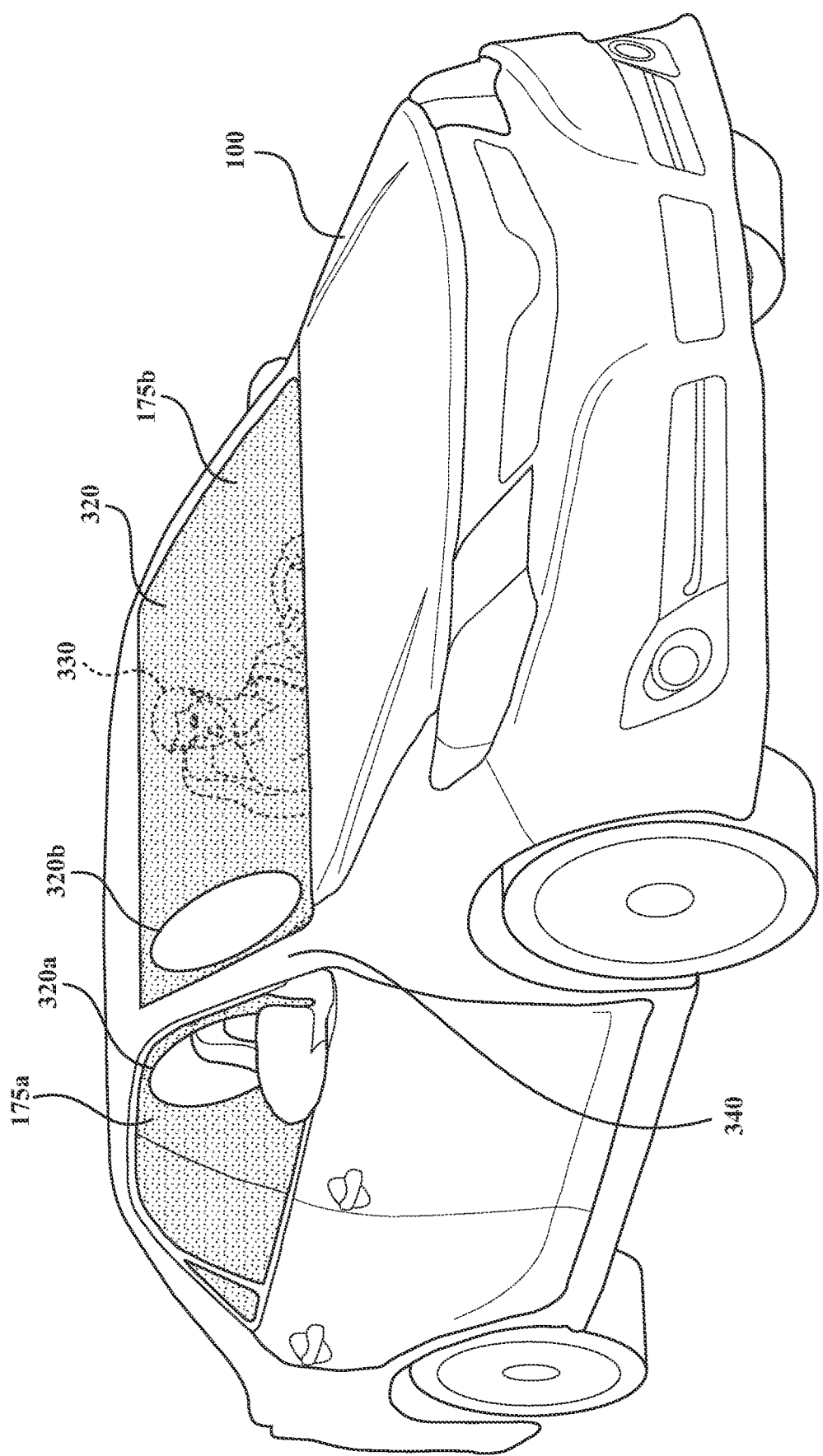
FIG. 3B illustrates deployment of an attention guidance system to guide a vehicle occupant's attention to a particular region of the environment, in accordance with another illustrative embodiment of the invention.

FIG. 3B illustrates deployment of an attention guidance system 170 to guide a vehicle occupant's attention to a particular region of the environment, in accordance with another illustrative embodiment of the invention. In this embodiment, the particular region selected by environment analysis module 220 lies in a direction that, from the perspective of the driver 330, is approximately bisected by an A-Pillar 340 of vehicle 100. In such a case, transparency control module 230 can divide the first (more-transparent) portion 320 into two sub-portions, transparent sub-portion 320a and transparent sub-portion 320b, that straddle the A-Pillar 340. This facilitates the ability of driver 330 to see clearly the selected particular region in the external environment.

Transparency control module 230 can determine where to situate the transparent portion 320 from a knowledge of the location and vantage point, within the vehicle, of the occupant and geometric calculations that determine with what portion of a window 175 the user's gaze will intersect as the occupant looks toward the particular region in the external environment selected by environment analysis module 220.

How much less transparent the second (less-transparent) portion is than the first (more-transparent) portion can depend on several factors. In one embodiment, transparency control module 230 adjusts how much less transparent the second portion is than the first portion (transparent portion 320) based on one or more of the following factors: detected outdoor lighting conditions, the density of detected external road agents in the environment, and the estimated risk level associated with an automatically detected current traffic situation. One objective of transparency control module 230 is to avoid obstructing a driver's view of potentially important secondary traffic situations or conditions besides those the driver can readily see through transparent portion 320. Consequently, in some cases transparency control module 230 reduces the contrast (difference) in transparency between the more-transparent portion(s) and the less-transparent portion(s) to permit the driver to have a clearer view, through the less-transparent portion(s), of automatically detected traffic situations and conditions of secondary importance.

Figure 4A:
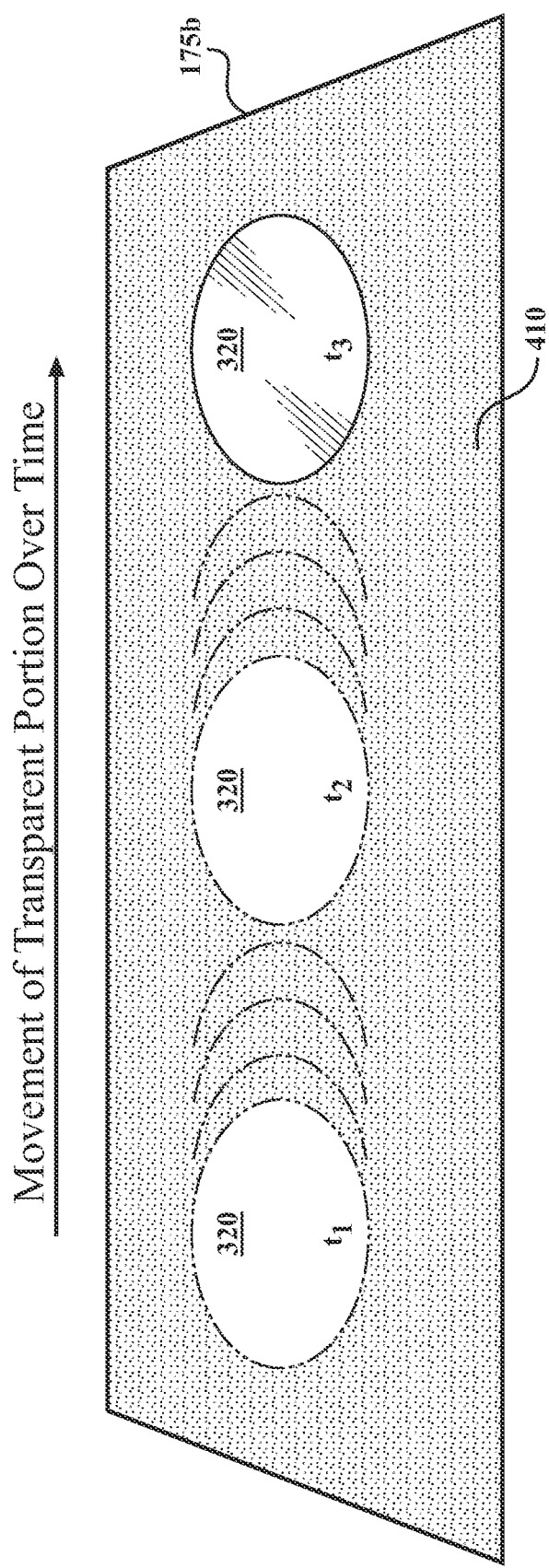
FIG. 4A illustrates dynamically moving a transparent portion of a vehicle window to guide a vehicle occupant's attention to a particular region of the environment, in accordance with an illustrative embodiment of the invention.

FIG. 4A illustrates dynamically (animatedly) moving a transparent portion 320 of a vehicle window 175 to guide a vehicle occupant's attention to a particular region of the environment, in accordance with an illustrative embodiment of the invention. In the embodiment illustrated in FIG. 4A, attention guidance system 170 includes gaze detection module 240 (refer to FIG. 2), which detects and tracks the current gaze direction of a vehicle occupant (in this example, the driver of vehicle 100). Gaze detection module 240 uses techniques such as analyzing images from one or more interior cameras 126 to determine in which direction a vehicle occupant is looking. Such analysis can include, for example, determining in which direction the driver's pupils are pointed, in which direction the driver's face is pointed, or a combination of the two.

Initially, at a time $t_1$, transparency control module 230 creates transparent portion 320 (whose greater transparency contrasts with less-transparent portion 410) at a position that coincides with the driver's detected current gaze direction. In this example, the driver is looking approximately straight ahead through the windshield 175b. At a later time, $t_2$, transparency control module 230 has moved transparent portion 320 to the position indicated (approximately the middle of the windshield 175b). At a still later time, $t_3$, transparency control module 230 has moved the transparent portion 320 to a position that enables the driver to see clearly, through the transparent portion 320, the particular region in the external environment selected by environment analysis module 220. It should be understood that this movement of the transparent portion 320 across the windshield 175b in this example can be accomplished in a short period (e.g., a second or two), and the movement of the transparent portion 320 across the windshield 175b can appear, to the driver's eyes, to be smooth, in some embodiments. The particular intermediate point in time $t_2$ shown in the FIG. 4A is merely one arbitrary intermediate position of many between the initial and final positions. The animated movement of the transparent portion 320 illustrated in FIG. 4A has the natural effect of guiding the driver's attention from wherever the driver is currently looking to the particular region identified by environment analysis module 220. In this example, the final position of transparent portion 320 coincides with an important automatically detected traffic situation to which the driver of vehicle 100 should pay attention.

In other situations, the animated movement of the transparent portion 320 discussed above in connection with FIG. 4A can be applied to a vehicle occupant other than the driver (e.g., to a passenger who is interested in a landmark but who is looking in the wrong direction initially to see it). Also, in some situations, transparency control module 230 can cause the transparent portion 320 to move from one window 175 (e.g., a side window) to another (e.g., the windshield) or vice versa, depending on what the occupant's initial gaze direction happens to be and where the particular region is.

In some embodiments, if the vehicle occupant's gaze direction detected by gaze detection module 240 coincides with the particular region selected by environment analysis module 220 (i.e., if the occupant is already looking at the particular region through a transparent portion 320 of a window 175), transparency control module 230 maintains the current transparency configuration of the one or more windows 175. In other words, in such a case, there is no need to adjust the transparency of the one or more windows 175 to guide the occupant's attention to the particular region, since the occupant's attention is already directed there.

The techniques discussed above for a single transparent portion 320 can be extended to a plurality of transparent portions 320. Some examples are illustrated in FIGS. 4B and 4C.

Figure 4B:
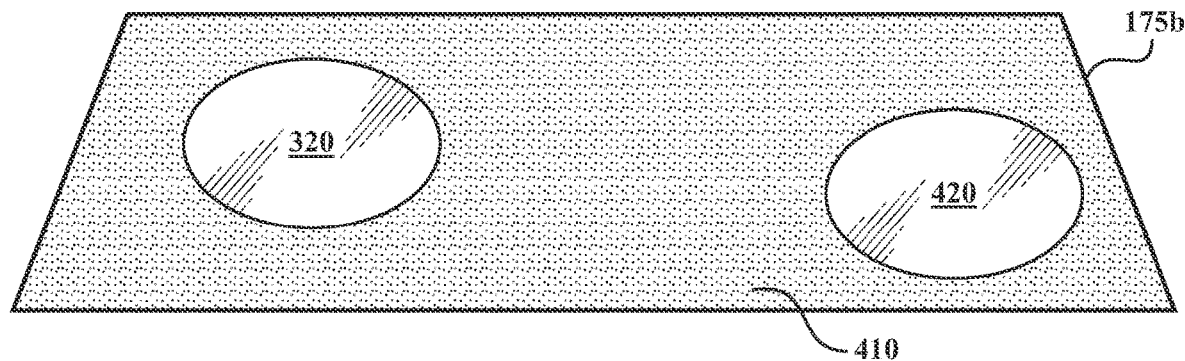
FIG. 4B illustrates an attention guidance system generating two disjoint transparent portions of a vehicle window, in accordance with an illustrative embodiment of the invention.

FIG. 4B illustrates an attention guidance system 170 generating two disjoint transparent portions 320 and 420 of a vehicle window 175, in accordance with an illustrative embodiment of the invention. In the example of FIG. 4B, environment analysis module 220 has selected a particular region of the environment (approximately straight ahead, from the driver's perspective) due to a critical automatically detected traffic situation in that direction and has also identified another region of the environment that, though of secondary importance, the driver should nevertheless be able to see clearly and to which the driver should pay attention. In this embodiment, transparency control module 230 generates transparent portion 320 at the primary location and additional transparent portion 420 at the secondary location. For example, in some embodiments, additional transparent portion 420 enables the driver to see, through the additional transparent portion 420, an automatically detected traffic situation. In this example, transparent portion 320 and additional transparent portion 420 are disjoint, as shown in FIG. 4B.

Figure 4C:
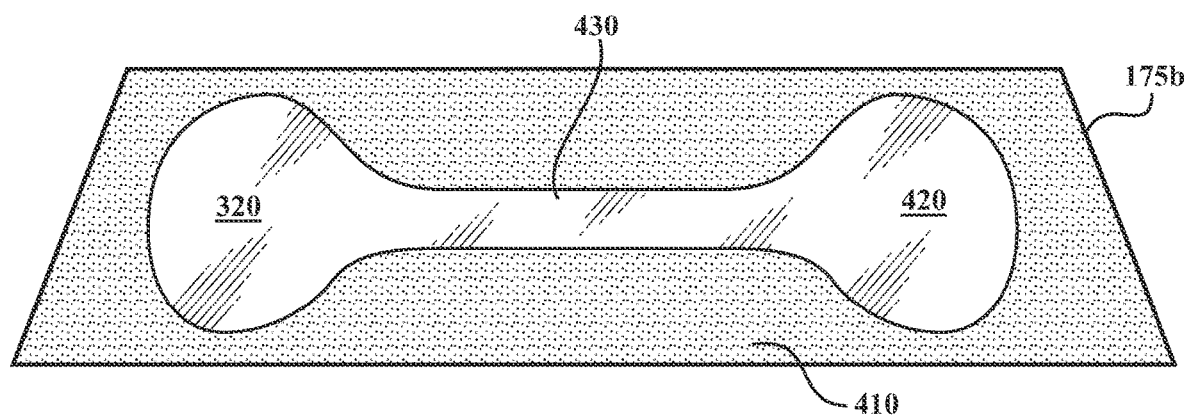
FIG. 4C illustrates an attention guidance system generating two connected transparent portions of a vehicle window, in accordance with another illustrative embodiment of the invention.

FIG. 4C illustrates an attention guidance system 170 generating two connected transparent portions 320 and 420 of a vehicle window 175, in accordance with another illustrative embodiment of the invention. In this example, the same underlying scenario applies regarding the automatically detected traffic situations (primary and secondary) as in the embodiment of FIG. 4B, but, in this embodiment, transparency control module 230 connects the transparent portion 320 and the additional transparent portion 420 with a connecting portion 430 of arbitrary shape. Such a connection between transparent portion 320 and additional transparent portion 420 can assist the driver in paying attention to both regions of the external environment.

Figure 5:
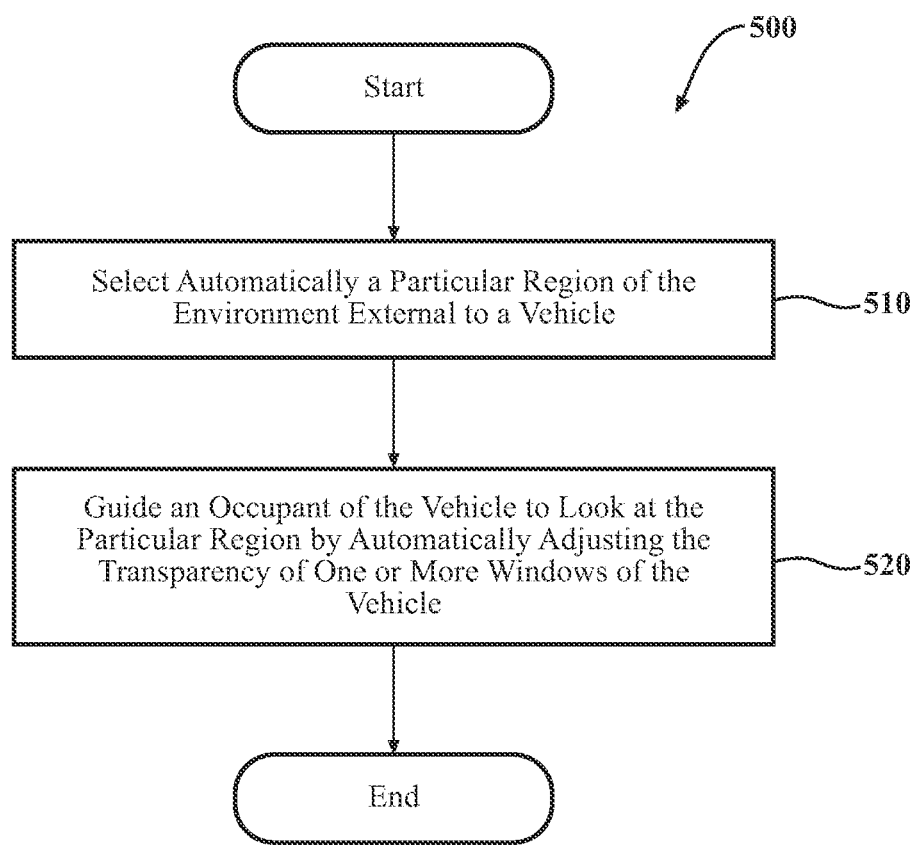
FIG. 5 is a flowchart of a method of guiding a vehicle occupant's attention, in accordance with an illustrative embodiment of the invention.

FIG. 5 is a flowchart of a method 500 of guiding a vehicle occupant's attention, in accordance with an illustrative embodiment of the invention. Method 500 will be discussed from the perspective of the attention guidance system 170 in FIG. 2. While method 500 is discussed in combination with attention guidance system 170, it should be appreciated that method 500 is not limited to being implemented within attention guidance system 170, but attention guidance system 170 is instead one example of a system that may implement method 500.

At block 510, environment analysis module 220 selects a particular region of the environment external to a vehicle 100. As discussed above, selecting a particular region of the environment involves identifying a particular subregion of the environment as being important (e.g., to the safety of vehicle 100 and its occupants) or otherwise of interest to a vehicle occupant (driver or passenger). For example, such a particular region might include one or more external road agents (other vehicles, motorcyclists, bicyclists, pedestrians, and/or animals), obstacles, or road-geometry characteristics (curves, potholes, intersections, on-ramps, etc.) that could lead to a collision or other accident, if the driver of vehicle 100 does not take proper corrective action. As also discussed above, in a different embodiment, the particular region can include a landmark that is of interest to at least one vehicle occupant. Such a landmark can be identified based on map data 116 and the vehicle's geolocation capabilities (refer to FIG. 1), information received over network 190 from a server or other network node 185, and/or an analysis of sensor data 119 from sensor system 120. As discussed above, in general, the objective of environment analysis module 220 is to identify one or more particular regions of the external environment to which a vehicle occupant (driver or passenger) should pay attention (i.e., look at and be aware of).

At block 520, transparency control module 230 adjusts the transparency of one or more windows 175 of the vehicle 100 such that a first portion of the one or more windows 175 through which the occupant is able to see the particular region is more transparent than a second portion of the one or more windows 175 that is adjacent to the first portion. As discussed above, there is contrasting transparency between the first and second portions that naturally causes the occupant's attention to be drawn to the first (more-transparent) portion. Adjusting the transparency of a particular arbitrarily shaped portion of a window 175 between fully transparent or nearly fully transparent and opaque or nearly opaque is possible because the one or more windows 175 are any of several types known in the art as "smart glass." Examples include, without limitation, electrochromic glass and windows 175 embodying TFT technology, such as a transparent LCD having a glass substrate. In some embodiments, the control of transparency is accomplished by varying the density (resolution) of pixels in the smart glass under electronic control by transparency control module 230.

In other embodiments, method 500 can include other actions that are not shown in FIG. 5. For example, in some embodiments, method 500 includes detecting the gaze direction of a vehicle occupant via gaze detection module 240. Detecting the gaze direction of the occupant supports embodiments including features such as animated/dynamic movement of a transparent portion 320 from an initial position that coincides with the detected gaze direction to a final position at which the occupant is able to see the particular region of interest through the first (more-transparent) portion of the one or more windows 175. This feature is described in greater detail above in connection with FIG. 4A. Detecting the gaze direction of the occupant also supports embodiments in which transparency control module 230 maintains the current transparency configuration of the one or more windows 175, when the detected gaze direction already coincides with the particular region. This feature avoids changing the transparency of the windows 175 when it is not necessary.

In other embodiments, method 500 includes the transparency control module 230 dividing the first (more-transparent) portion into two sub-portions that straddle a pillar (e.g., an A-Pillar or B-Pillar) of vehicle 100, as illustrated in FIG. 3B. In still other embodiments, method 500 includes transparency control module 230 adjusting the transparency of the one or more windows 175 such that a third portion (see additional transparent portion 420 in FIGS. 4B and 4C) of the one or more windows 175 that is either disjoint from or connected with the first portion (transparent portion 320) and adjacent to the second portion (less-transparent portion 410) is also more transparent than the second portion (less-transparent portion 410). In some embodiments, transparency control module 230 situates the third portion (additional transparent portion 420) such that the driver of vehicle 100 is able to see, through the third portion (420), a region of the environment associated with an automatically detected traffic situation of secondary importance, as discussed above.

In some embodiments, method 500 includes the transparency control module 230 adjusting how much less transparent the second (less-transparent) portion is than the first (more-transparent) portion based on one or more of the following factors: detected outdoor lighting conditions, the density of detected external road agents in the environment, and the estimated risk level associated with an automatically detected current traffic situation.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for guiding a vehicle occupant's attention, the system comprising:
   one or more processors; and
   a memory communicably coupled to the one or more processors and storing:
   an environment analysis module including instructions that when executed by the one or more processors cause the one or more processors to select a particular region of an environment external to a vehicle, wherein the particular region includes one or more of an external road agent, an obstacle, a road-geometry characteristic, and a landmark that is of interest to an occupant of the vehicle; and
   a transparency control module including instructions that when executed by the one or more processors cause the one or more processors to adjust the transparency of one or more windows of the vehicle such that a first portion of the one or more windows through which the occupant is able to see the particular region is more transparent than a second portion of the one or more windows that is adjacent to the first portion to visually highlight the particular region and draw the attention of the occupant to the particular region, wherein the first portion occupies an area smaller than an entire area of the one or more windows.

2. The system of claim 1, wherein the occupant is one of a driver of the vehicle and a passenger in the vehicle.

3. The system of claim 1, further comprising a gaze detection module including instructions that when executed by the one or more processors cause the one or more processors to detect a gaze direction of the occupant, wherein the instructions in the transparency control module to adjust the transparency of the one or more windows of the vehicle include instructions that when executed by the one or more processors cause the one or more processors to adjust the transparency of the one or more windows over time to cause the first portion to move from an initial position at the detected gaze direction to a final position at which the occupant is able to see the particular region through the first portion.

4. The system of claim 1, further comprising a gaze detection module including instructions that when executed by the one or more processors cause the one or more processors to detect a gaze direction of the occupant, wherein the instructions in the transparency control module to adjust the transparency of the one or more windows of the vehicle include instructions that when executed by the one or more processors cause the one or more processors to maintain a current transparency configuration of the one or more windows, when the detected gaze direction is toward the particular region.

5. The system of claim 1, wherein the transparency control module includes further instructions that when executed by the one or more processors cause the one or more processors to divide the first portion into two subportions that straddle a pillar of the vehicle.

6. The system of claim 1, wherein the transparency control module includes further instructions that when executed by the one or more processors cause the one or more processors to adjust the transparency of the one or more windows such that a third portion of the one or more windows that is one of disjoint from and connected with the first portion and adjacent to the second portion is also more transparent than the second portion.

7. The system of claim 6, wherein the occupant is a driver of the vehicle and the transparency control module includes further instructions that when executed by the one or more processors cause the one or more processors to situate the third portion such that the driver is able to see, through the third portion, a region of the environment associated with an automatically detected traffic situation.

8. The system of claim 1, wherein the transparency control module includes further instructions that when executed by the one or more processors cause the one or more processors to adjust how much less transparent the second portion is than the first portion based on one or more of detected outdoor lighting conditions, a density of detected external road agents in the environment, and an estimated risk level associated with a detected current traffic situation.

9. The system of claim 1, wherein the one or more windows include at least one of a windshield, one or more side windows, and a rear window and the one or more windows are one of electrochromic glass and liquid-crystal displays having a glass substrate.

10. A non-transitory computer-readable medium for guiding a vehicle occupant's attention and storing instructions that when executed by one or more processors cause the one or more processors to:
select automatically a particular region of an environment external to a vehicle, wherein the particular region includes one or more of an external road agent, an obstacle, a road-geometry characteristic, and a landmark that is of interest to an occupant of the vehicle; and
adjust automatically the transparency of one or more windows of the vehicle such that a first portion of the one or more windows through which the occupant is able to see the particular region is more transparent than a second portion of the one or more windows that is adjacent to the first portion to visually highlight the particular region and draw the attention of the occupant to the particular region, wherein the first portion occupies an area smaller than an entire area of the one or more windows.

11. A method of guiding a vehicle occupant's attention, the method comprising:
selecting automatically a particular region of an environment external to a vehicle, wherein the particular region includes one or more of an external road agent, an obstacle, a road-geometry characteristic, and a landmark that is of interest to an occupant of the vehicle; and
adjusting the transparency of one or more windows of the vehicle such that a first portion of the one or more windows through which the occupant is able to see the particular region is more transparent than a second portion of the one or more windows that is adjacent to the first portion to visually highlight the particular region and draw the attention of the occupant to the particular region, wherein the first portion occupies an area smaller than an entire area of the one or more windows.

12. The method of claim 11, wherein the occupant is one of a driver of the vehicle and a passenger in the vehicle.

13. The method of claim 11, further comprising detecting a gaze direction of the occupant, wherein adjusting the transparency of one or more windows of the vehicle includes adjusting the transparency of the one or more windows over time to cause the first portion to move from an initial position at the detected gaze direction to a final position at which the occupant is able to see the particular region through the first portion.

14. The method of claim 11, further comprising detecting a gaze direction of the occupant, wherein adjusting the transparency of one or more windows of the vehicle includes maintaining a current transparency configuration of the one or more windows, when the detected gaze direction is toward the particular region.

15. The method of claim 11, wherein the first portion is divided into two sub-portions that straddle a pillar of the vehicle.

16. The method of claim 11, further comprising adjusting the transparency of the one or more windows such that a third portion of the one or more windows that is one of disjoint from and connected with first portion and adjacent to the second portion is also more transparent than the second portion.

17. The method of claim 16, wherein the occupant is a driver of the vehicle and the third portion enables the driver to see a region of the environment associated with an automatically detected traffic situation.

18. The method of claim 11, wherein how much less transparent the second portion is than the first portion depends on one or more of automatically detected outdoor lighting conditions, a density of automatically detected external road agents in the environment, and an estimated risk level associated with an automatically detected current traffic situation.

* * * * *